O. W. Noble,
Cover for Lenses of Photographic Cameras.

No. 117318 — Patented Jul 25 1871

Witnesses:
M. Vorland
L. S. Mabee

Inventor:
O. W. Noble
per Munn & Co.
Attorneys.

UNITED STATES PATENT OFFICE.

OSCAR W. NOBLE, OF DARLINGTON, WISCONSIN, ASSIGNOR TO HIMSELF AND LUKE AGUR, OF SAME PLACE.

IMPROVEMENT IN COVERS FOR THE LENSES OF PHOTOGRAPHIC CAMERAS.

Specification forming part of Letters Patent No. 117,318, dated July 25, 1871.

*To all whom it may concern:*

Be it known that I, OSCAR W. NOBLE, of Darlington, in the county of La Fayette and State of Wisconsin, have invented a new and Improved Cover for Lenses of Photographic Cameras; and I do hereby declare that the following is a full, clear, and exact description thereof, which will enable others skilled in the art to make and use the same, reference being had to the accompanying drawing forming part of this specification, in which—

Figure 1:
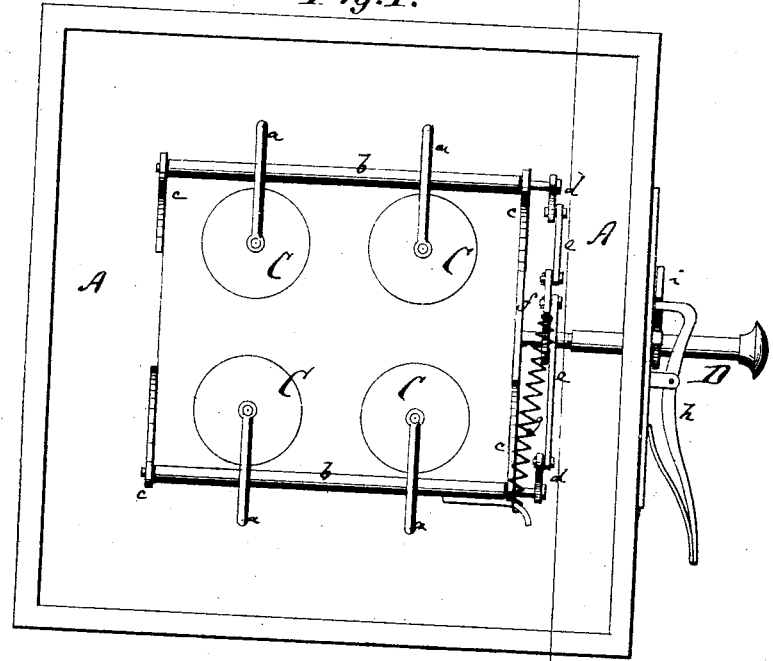
Figure 2:
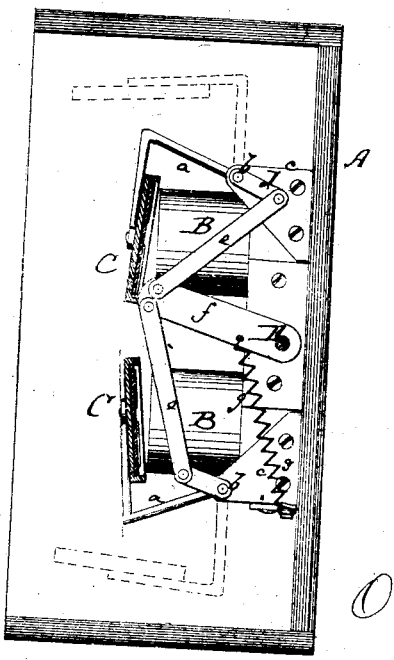

Figure 1 represents a face view of a camera provided with my improved spring-cover. Fig. 2 is a sectional side view of the same.

Similar letters of reference indicate corresponding parts.

My invention relates to covers for lenses of photographing apparatus; and consists in the improvement hereinafter described and clearly pointed out in the claim.

A in the drawing represents the body of a photographic camera or apparatus, provided with one or more lens-tubes or sockets, B B. C is a cap or cover of circular or such other form as to completely cover the lens. This cap or cover is made of metal or other opaque substance, and is secured, by means of a projecting arm, $a$, to a pin or arbor, $b$, hung in ears $c$ that project from the camera. Where there are two or more lenses on one instrument there are as many caps C— one for each lens—and all these caps are connected with the same arbor $b$, or each with a separate arbor, or they are in pairs, connected with different arbors $b$, as shown in Fig. 1. Each arbor $b$ is provided with a crank, $d$, which is, by a rod, $e$, connected with a crank, $f$, on a rock-handle, D. By turning said handle the arbor or arbors can be swung to open or close the lenses by means of the caps. A spring, $g$, connects with the crank $f$ or other part of the apparatus, and tends to hold the caps open. $h$ is a spring-catch arranged on the camera and serving to fit against an arm, $i$, that projects from the handle D. When the handle D is turned to close the lens or lenses the catch $h$ will lock it and serve to keep the lenses closed. When the same are to be opened the catch is touched to release the handle, whereupon the spring will cause the immediate and rapid opening of the lens or lenses in the manner indicated by dotted lines in Fig. 2.

Although the mechanism above shown is also my invention, it is evident that the same may be considerably varied and that the main invention consists in the application of hinged caps to photographic cameras for the purpose of covering and uncovering the lenses of the same.

Having thus described my invention, I therefore claim as new and desire to secure by Letters Patent—

The arrangement of arm $a$, arbor $b$, ears $c$, crank $d$, rod $e$, crank $f$, and handle D, as described and for the purpose of operating cap C.

OSCAR W. NOBLE.

Witnesses:
D. B. OTIS,
JAMES HILLIS.